Dec. 25, 1962  S. A. ZARLENG  3,070,710
TRANSISTOR CONTROL CIRCUIT WITH SATURABLE
CORE FEEDBACK TRANSFORMER MEANS
Filed June 24, 1958  2 Sheets-Sheet 1
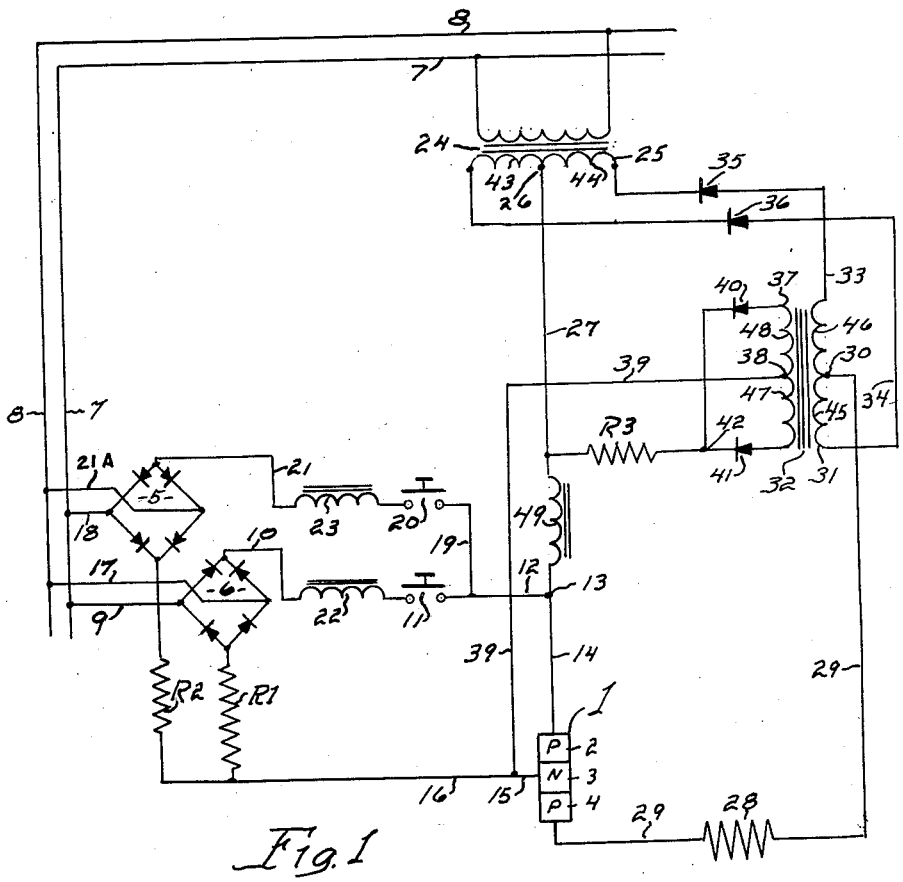
Fig. 1
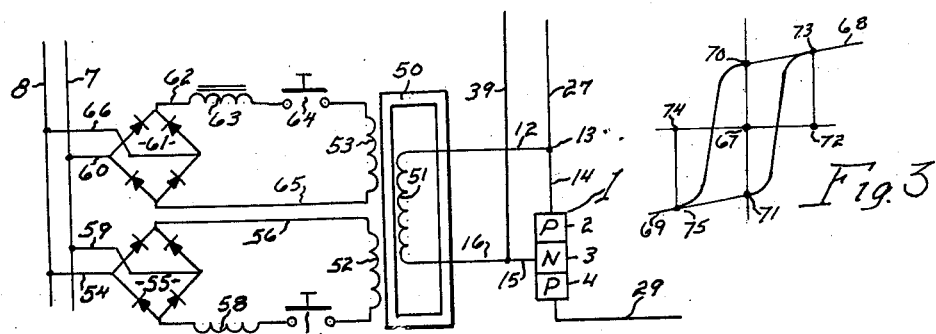
Fig. 2
Fig. 3
INVENTOR.
Steve A. Zarleng
BY Harry P Canfield
Attorney United States Patent Office 3,070,710
Patented Dec. 25, 1962

3,070,710
TRANSISTOR CONTROL CIRCUIT WITH SATURABLE CORE FEEDBACK TRANSFORMER MEANS
Steve A. Zarleng, Akron, Ohio, assignor to The Clark Controller Company, Cleveland, Ohio, a corporation of Ohio
Filed June 24, 1958, Ser. No. 744,251
4 Claims. (Cl. 307—88.5)

The invention hereof relates to electric control systems; and relates more particularly to control systems or circuit complexes that operate in a manner to supply output current from a current source to a load to be energized, alternately, at a high value, and at zero value.

Such control systems are known and are sometimes arranged to respond in this manner to the operation and restoring of two contactors. When one contactor is operated, it causes the system to deliver high output and to maintain that high output after the contactor has been restored; and when the other contactor is operated, it causes the system to reduce its output to zero value, and to so maintain it when said other contactor is restored.

The present invention relates more particularly to control systems having the aforesaid characteristics of operation.

In my copending patent application, Serial No. 507,643, Patent No. 2,966,979, I have shown in FIG. 1 a control system of this type, and the present invention may be considered as an improvement thereover.

In the control system of that application, two contactors and three transistors are utilized. Upon the operation of one contactor, a first one of the transistors is rendered conducting, and is immediately maintained conducting by a second transistor, and current flows through the first transistor and to a third transistor, rendering it conducting, and current is conducted through the third transistor to a load.

The said one contactor may be restored without changing these conditions.

Then the load current may be reduced to zero value by operation of the other one of the two contactors, which renders the first transistor non-conducting and it is maintained non-conducting when the said other contactor is restored.

The present invention is shown and described hereinafter in two forms, each of which is an improvement over that of my said pending application in that, among other differences, it requires only one transistor.

In the first form, upon operating one of the two contactors the transistor is rendered conducting, and current from a supply source flows at full value through the transistor and through the load; and current is derived from the load current to actuate a feedback transformer, the output of which maintains the transistor conducting. The said one contactor may then be restored, without changing these conditions.

Then the load current may be reduced to zero value by operating the other contactor, which renders the transistor non-conducting.

As an alternative mode of operation of this form, after the one contactor has been operated and the full value of current flows through the load as described, the one contactor may be maintained operated and not restored; and to reduce the load current to zero value, the said other contactor may be operated to render the transistor non-conducting.

Then to again cause full load current to flow, the said other contactor may be restored. The said one contactor being still operated, the transistor will be rendered conducting thereby, and full current to the load will again flow as described.

According to this alternative mode of operation, when the transistor has once been rendered conducting by operating the one contactor, and it is then maintained operated, the transistor may be rendered non-conducting and again conducting, alternately, by alternately operating and restoring the said other contactor.

In the second form of the invention a saturable transformer is provided having two opposed primaries energizable respectively by the aforesaid two contactors; and having a secondary connected to the transistor.

By one mode of operation, upon closing one contactor, one primary saturates the transformer, and in doing so, a pulse of secondary current renders the transistor conducting and full value of load current flows through it and current derived from the load current maintains it conducting. The one contactor may then be opened.

The load current may then be reduced to zero value, by closing the other contactor to energize the other primary to cause it to saturate the transformer in the opposite direction which causes a pulse of secondary current to render the transistor non-conducting and stop the flow of load current through it. The said other contactor may then be opened.

According to an alternative mode of operation of this second form of the invention, one primary is always energized to saturate the transformer in the direction to cause the transistor to be conducting, and the other primary has sufficient magnetomotive force to overpower that of the one primary and reverse the saturation of the transformer and render the transistor non-conducting.

The load current is therefore caused to flow at full value or to be cut off, respectively, by alternately opening and closing a single contactor that effects deenergization and energization of the overpowering primary.

It is among the objects of the invention:

To provide, generally, an improved control system of the type referred to above;

To provide an improved control system having, among others, features set forth in the foregoing brief description of the invention;

To provide a control system comprising a transistor in the path of load current from a current source through a load and rendered conducting by initiation of current flow in an activating current path in the transistor in a first direction and maintained conducting by current in said activating path in said direction derived from the load current; and rendered non-conducting by initiation of current in said activating path in the opposite direction.

Other objects will occur to those skilled in the art, from a reading of the following full description of the invention.

An embodiment of the invention and a modification thereof are fully described in the following description taken in connection with the accompanying drawing in which:

FIG. 1 is a diagrammatic view of an electric system embodying the invention in one form;

FIG. 2 is a diagrammatic view of a modification of the embodiment of FIG. 1;

FIG. 3 is a view illustrating a hysteresis curve, by reference to which, operation of the modification of FIG. 2 is explained; and, FIG. 4 is a view of the embodiment of FIG. 2 in simplified form.

Figure 4:
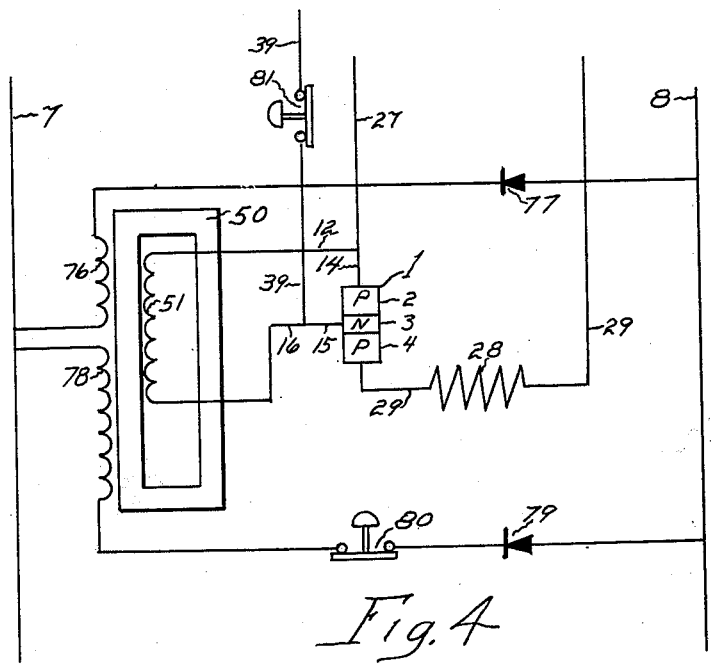

Referring to FIG. 1 of the drawing there is shown at 1 the one transistor of the premises.

It is of the PNP type and comprises an emitter 2, a base 3, and a collector 4.

There are two circuits controlling, respectively, conductivity and non-conductivity of the transistor 1; energized with unidirectional potential of opposite polarity, from quadrilateral rectifiers 5 and 6, which receive input from alternating supply mains 7—8.

As to one of said circuits, a half wave of current from main 7 has a path by wire 9, through rectifier 6, by wire 10, through normally open contacts of one contactor 11, by wires 12 and 14 to emitter 2; and through the activating circuit of the transistor to base 3, and thence by wires 15 and 16 and a resistor R1, through the rectifier 6 and by wire 17 to supply line 8.

The next half wave has a similar path from main 8 by wire 17, through rectifier 6, and thence by wire 10, contactor 11, and again by wire 14 through the emitter 2 and base 3 of the transistor and back by wires 15—16 and resistor R1, through the rectifier 6 to wire 9 and main 7.

Upon closing contactor 11, full wave rectified current in this circuit will go from emitter 2 to base 3 in the transistor and will render the transistor conducting, as is well known.

As to the other of said circuits, a half wave of current from supply main 7 has a path by wire 18, through the rectifier 5, resistor R2, wires 16 and 15, to the base 3 and from emitter 2 by wires 14, 12 and 19; through normally open contacts of another contactor 20, wire 21 through the rectifier 5, and by wire 21A to line 8.

Similarly the next half wave will go from main 8 by wire 21A through rectifier 5, by resistor R2, wires 16—15 to base 3 of the transistor and from its emitter 2, and by wires 14—12, contactor 20 and rectifier 5 and wire 18 to main 7.

Upon closing contactor 20, full wave rectified current in this circuit will go from 3 to 2 in the transistor and will render the transistor non-conducting.

If the contactor 11 happens to be operated when contactor 20 is operated, the current in the line of the contactor 20, flowing in the transistor from 3 to 2, will overpower the current in line of closed contactor 11 and render the transistor non-conducting.

To insure that this overpowering effect will occur, and assuming equal output potentials for the rectifiers 5 and 6, the resistance of resistor R2 will be made less than that of R1.

To iron out both half wave pulses in the rectified currents in these two circuits, so that the current will not go to zero value between the half waves, inductors 22 and 23 are provided in the respective circuits.

The inductors will delay the decay of each impulse so that it will be overlapped by the beginning of the next succeeding impulse and convert the unidirectional half waves into continuous unidirectional current.

At 24 is a main transformer, with its primary connected across the mains 7 and 8; and having a secondary 25 with a mid-point 26, from which a wire 27 goes to the said wire 14 and thence to the emitter 2 of the transistor.

A load 28 to be energized is connected in a line 29—29 between the collector 4 and the mid-point 30, of the primary 31, of a feedback transformer 32.

The ends of the primary 31 are connected, respectively, by wires 33—34 through rectifier units 35—36, to the ends of the main transformer secondary 25.

The secondary 37 of the transformer 32 has a mid-point 38 connected by a wire 39 to the wire 15 and thus to the base 3.

The ends of the secondary 37 are connected, respectively, through rectifier units, 40 and 41, to a connection point 42, and thence through a resistor R3 to the wire 27.

At the main transformer 24 the halves of the secondary 25 are designated as 43 and 44.

At the feedback transformer 32, the halves of the primary 31 are designated as 45 and 46; and the halves of the secondary 37 are designated as 47 and 48.

In the operation of the system of FIG. 1, all current to energize the load 28 must go through the transistor; and normally, contactor 11 and contactor 20 are open; and the transistor 1 is non-conducting and no current flows to the load.

Upon closing contactor 11, current flows over the above described circuit from line 8, by way of wire 17, rectifier 6, wire 10, inductor 22, contactor 11, wire 12, and wire 14 into the emitter 2 and from the base 3 by way of wire 15, wire 16, resistor R1, rectifier 6 and wire 9 to line 7; and this renders the transistor 1 conducting.

Current then flows from the mid-point 26 of the main transformer 24 by wires 27 and 14 to the emitter 2 and out at the collector 4, and by wire 29 through the load 28, to the mid-point 30 of the primary 31 of the feedback transformer 32; and thence back to the main transformer secondary 25.

In fuller explanation of this load energizing circuit; a half wave of A.C. in the main secondary 25 flowing, say, toward the right, can flow only in the half 43 of the secondary and into wire 27, since flow in the other half is blocked by the rectifier 35.

The load current at the mid-point 30 of the feedback transformer primary 31, will flow down through the primary half 45 and by wire 34 and rectifier 36 to the left end of the main secondary half, 43.

Similarly, as will now be understood, the next half wave in the secondary 25, flowing toward the left, will flow in only the half 44 of the secondary to the wire 27; and at the feedback transformer, the flow from the mid-point 30 will be through the upper half 46 of the primary, and through rectifier 35 and back to the half 44.

Both half waves from the main transformer 24 thus flow downwardly as unidirectional current through the transistor 1 and the load 28, upon rendering the transistor conducting by closing contactor 11.

As explained in the premises it is a part of the invention that the transistor will be maintained conducting after opening the contactor 11, that is upon only momentary closing thereof. This is provided for as follows.

At the feedback transformer 32, the primary halves 45 and 46 are, as described, alternately energized in correspondence with the half waves of the A.C. supply. They accordingly induce potential in the secondary 37 alternately in opposite directions.

Potential in the up direction, corresponding to one half wave of the supply, can produce current in only the upper secondary half 48, current flow in the half 47 being blocked by the rectifier 41, and the current thus produced flows up in the half 48, through rectifier 40, to point 42, through resistor R3 to wire 27 and thence by wire 14, in at the emitter 2 of the transistor, out at its base 3, and by wire 15 to wire 39 and thence back to the mid-point 38 of the secondary.

Similarly as will now be understood, potential in the down direction in secondary 37 can produce current in only the lower secondary half 47, which will flow downwardly, through the rectifier 41 and resistor R3 to wires 27 and 14, and thence as before.

Thus corresponding to each half wave of the A.C. supply there is an impulse of unidirectional current going into the transistor at its emitter 2 and out at its base 3, which will maintain it conducting. Such current, in the absence of countervailing provisions would go to zero value between each impulse and the next one, and to prevent this, an inductor 49 is placed in the line of the wire 27, through which the impulses must flow successively. The action of such an inductor to convert the half wave unidirectional impulses into continuous unidirectional current has been explained in connection with the inductors 22 and 23.

The transistor will thus be maintained conducting, independently of the circuit controlled by the contactor 11, and this contactor may then be restored.

It will thus be seen that only an impulse of current through the contactor 11 is needed, to set the system in condition to supply unidirectional full current to the load 28 from the A.C. supply means 7—8.

To cut off the current to the load 28, or reduce it to zero value as of the premises the other contactor 20 to which is normally in restored or open condition is operated to close its contacts.

It will first be assumed that the contactor 11 has been restored, or its contacts opened; and that the transistor is being maintained conducting by the load feedback transformer 32 as described; this being the condition for the mode of operation here described.

Contacts 20 being operated, current flows from the supply line 7 over the above described path, wire 18, rectifier 5, resistor R2, wire 16, wire 15, to the base 3, and out at emitter 2, and by wire 14, wire 12 and wire 19, through contactor 20, and by wire 21, rectifier 5 and wire 21A to supply line 8.

This current in the transistor, as is well known, is in the direction to render the transistor non-conducting; and it may be made strong enough to do so and to overcome the conductivity maintaining current from the feedback transformer 32 above described, by giving a suitably low value to the resistor R2; and the flow of load current through the transistor stops.

Momentary closure of contactor 20, that is, a pulse only of current therethrough, is sufficient to produce this result and contactor 20 may now be restored, and the conditions of the system then obtaining will remain unchanged.

As a second mode of operation, the contactor 11 may be operated to set the system to supply full current to the load 28 as described, and thereafter be maintained operated. Then to reduce the load current to zero, the contactor 20 may be operated or its contacts closed.

As will be apparent from the foregoing description, current through the contactor 11 is in the direction to render the transistor conducting, and current through the contactor 20 is in the opposite direction, to render it non-conducting.

When contactor 20 is closed and contactor 11 is being maintained closed, the opposing current through contactor 20 is made great enough to overpower both the current through contactor 11 and that from the feedback transformer 32 and render the transistor non-conducting, and stop the load current.

This can be effected by providing the resistor R2 in the path of the contactor 20, with sufficiently low resistance.

Upon again opening or restoring contactor 20, contactor 11 will still be maintained operated and the current therethrough will render the transistor conducting and the load current will again flow through it.

Thus by this second mode of operation, the load current can be reduced to zero by operating the contactor 20, and raised again to its full value by restoring the contactor 20, and so on alternately.

The difference in this mode of operation is that when the contactor 20 is closed, it must be maintained closed as long as zero load current is wanted, and not be closed only momentarily.

A modification of the above described system is illustrated in FIG. 2, and explained by the saturation curve of FIG. 3.

In FIG. 2, some of the parts are the same as in FIG. 1 and have been given the same reference numerals to identify them.

At 50 is a closed magnetic circuit which functions in some respects like a transformer core, having a secondary winding 51 and two primary windings 52 and 53 thereon.

The secondary winding 51 has one end connected by wire 12 to a point 13 and thence by wire 14 to the emitter 2 of the transistor 1; and has the other end connected by wires 16 and 15 to the transistor base 3.

The primary winding 52 is in a circuit connected to the A.C. supply mains 7—8. The circuit provides a current path through a wire 54 from the main 8, through a quadrilateral rectifier 55 to a wire 56 thence through the winding 52 and through a normally open or restored contactor 57, when closed, and through an inductor 58 through the rectifier 55, and by wire 59 to the main 7.

The primary winding 53 is in a similar circuit, providing a current path through a wire 60 from the main 7, through a rectifier 61 to a wire 62 thence through an inductor 63 and through a normally open or restored contactor 64, when closed, and through the winding 53 to a wire 65 and through the rectifier 61 and by a wire 66 to the main 8.

The primary windings 52 and 53 are wound and connected so that their magnetomotive forces will be in opposite directions, and preferably equal.

The material of the magnetic core 50 is chosen to have a hysteresis loop with characteristics such as illustrated in FIG. 3. Magnetomotive force in the positive, or negative, direction (right or left) from the point 67, will effect a rapid rise or fall, of the flux to saturation, as at 68 or 69. The saturation value of flux remains substantially level when the magnetomotive force is removed, giving a high value of residual flux as at the points 70 or 71.

In a first mode of operation of the system of FIG. 2 the contactors 57 and 64 are both normally open.

To cause the system to supply full current to the load by wire 29, the contactor 57 is operated or closed. Current from the lines 8 and 7, rectified at the rectifier 55 gives current to the primary winding 52 over the above described circuit.

Assuming that the core 50 has been saturated by previous operation and that its residual saturation flux is at the point 71 of FIG. 3, the ampere turns of the primary winding 52, will go, say, from point 67 to point 72 in FIG. 3, and will reverse the flux in the core 50 and raise it to saturation at the point 73.

This change of flux in the core 50 will generate an impulse of current in the secondary winding 51; the windings 52 and 51 being poled so that the current impulse flows upwardly in the secondary 51 and out on lines 12 and 14 to the emitter 2 of the transistor and out therefrom at the base 3 and back by line 16 to the secondary 51.

The transistor 1 is thereby rendered conducting, and as described for FIG. 1 full load current flows in lines 27 and 14 through the transistor and by wire 29 to the load. The contactor 57 is then opened and the conductivity of the transistor is sustained by flow of current as in FIG. 1, from the feedback transformer 32 along wires 27 and 14, in at the emitter 2 and out at the base 3, and back to the feedback transformer 32 by wire 39.

Upon opening of contactor 57, de-energizing primary 52, the flux, FIG. 3, goes back from point 73 to point 70 and remains there as residual flux.

The saturation line 68 being almost level, very little change of flux and negligible impulse in winding 51 occurs.

To reduce the load current to zero, contactor 64 is operated closing its contacts and by the above described circuit, energizes primary winding 53, the ampere turns thereof going, say, from point 67 to point 74, FIG. 3.

Winding 53 being poled reversely with respect to winding 52, this gives a quick change of flux, in FIG. 3, from point 70 to point 75; and this quick change of flux generates an impulse of current in winding 51 in the down direction, and it flows therefrom in wires 16—15 to base 3 and out at emitter 2 and by wires 14—12 to secondary 51.

This as will be understood renders the transistor non-conducting, and load current ceases to flow therethrough.

Contactor 64 may now be opened or restored, and the flux will go to point 71 as residual flux; but again, due to the almost level characteristic of the saturation line 69, little change of flux value and a negligible impulse in winding 51 occurs.

Thus in FIG. 1 by a first mode of operation, the contactor 11 is closed to give full load current, and is then opened; and the contactor 20 is closed to give zero load current, and then opened; and by a second mode of operation contactor 11 is closed to give full load current and is held closed, and contactor 20 is closed and opened successively to give zero and full load current successively.

This first mode of operation of FIG. 1 has also been described above modified by the arrangement in FIG. 2, with primary windings 52 and 53 of opposite magnetomotive force, and preferably equal.

If now the second mode of operation as well as the first mode were wanted with FIG. 1 modified by FIG. 2, then a primary winding 53 would be provided of greater magnetomotive force than that of the winding 52, say twice as much. Then for the first mode of operation, when winding 53 is energized alone by contactor 64, to give zero load current, the contactor 57 being open, the first said mode of operation would be performed with the difference that in FIG. 3, the point 74 would be twice as far from the point 67 as it is in FIG. 3, and the point 75 would be twice as far along on the saturation curve 69 as the point 75; but the change in the flux producing an impulse in winding 51 would be that from point 70 to point 75 because the flux would change very little beyond the point 75; and the impulse would be little different from that above described for the first mode of operation with equal windings 53 and 52.

For the second mode of operation, to give zero current to the load by closing contactor 64 with contactor 57 held closed, the flux at the time would be say, at the point 73 for the magnetomotive force of the winding 52 alone, at point 72.

Upon closing contactor 64 giving the double magnetomotive force of winding 53, the latter would predominate over that of winding 52 and shift the resultant magnetomotive force from point 72 to point 74 and the flux at the point 73 would go to point 75 and produce the same impulse as in the first mode of operation, and upon successively closing and opening the contactor 64, with contactor 57 closed, the flux would go back and forth between points 75 and 73 and give successively opposite impulses in the secondary 51 and cause the load current to change from zero to full value successively.

It is convenient for purposes of the claims, to refer to the circuit in the transistor from the terminal end of the emitter 2 to the terminal side of the base 3, as the transistor activating circuit or path, to render the transistor conducting or non-conducting according to the direction of current in said path.

In FIG. 4 is shown a system of the general type of FIG. 2 but simplified and having a third mode of operation. It is arranged as an across-the-line class of diagrams.

Some of the parts have the same reference characters as in FIG. 2 to identify them without further description.

The saturable transformer 50 has its secondary 51 always connected as in FIG. 2 to the emitter 2 of the transistor 1 by wires 12 and 14 and to the base 3 by wires 16 and 15. The conductivity maintaining circuit is shown at wire 27, wire 14, wire 15 and wire 39.

A primary 76 is always connected across A.C. mains 7 and 8 through a rectifier 77 and is therefore always energized with half waves of the same polarity say positive.

A primary 78 is connected across the mains 7—8 through a rectifier 79 and through a contactor 80 which is normally closed; so that normally the primary 78 is energized with A.C. half waves which are synchronous with the half waves in the primary 76.

The primaries 76 and 78 are connected so that their magnetomotive forces are in opposition; and the magnetomotive force of the primary 78 is greater than that of the primary 76, say twice as great.

Normally, when potential is first supplied to the lines 7—8, both primaries 76 and 78 are simultaneously energized, and the primary 78 overpowers the primary 76 and saturates the transformer, as indicated, for example by the saturation line 69 of FIG. 3.

Any impulse generated in the secondary 51 by the primary 78 as the flux rises, goes downwardly in the secondary 51 and in at the base 3 and out at the emitter 2; the secondary 51 being connected so that this will be the case; and the transistor will be non-conducting and no load current will flow through it.

In operation, to give current to the load 28, the contactor 80 is opened. This de-energizes primary 78, leaving the primary 76 energized alone.

The flux in FIG. 3 then goes from the saturation line 69, through the point 71 and abruptly to the saturation line 68, under the magnetomotive force of primary 76 as represented say by the point 72.

This rapid change of flux generates current in the secondary 51 in the reverse direction, upwardly, the current going in at the emitter 2 and out at the base 3 and rendering the transistor conducting; and load current flows through it and through the load 28 by wire 27, wire 14 and wire 29.

This is an impulse, and at its end, when it comes to zero, the transistor would become non-conducting and cut off the load current, but the load current, by means of the feedback current already described, immediately flows in the wire 14, wire 15 and wire 39 and keeps it conducting.

To reduce the load current to zero, contactor 80 is closed, which energizes the primary 78 at its said preponderating value, which as described renders the transistor non-conducting.

In this form, FIG. 4, as another mode of operation, with load current flowing, and maintaining the transistor conducting, the load current can be cut off or reduced to zero by opening the feedback maintaining circuit, for example, by momentarily opening a contactor 81 in the line of the wire 39.

I claim:

1. In an electric control system, a transistor having a main and an activating circuit, an electric load connected to a source of current; the main circuit of said transistor connected between the load and source to allow the flow of current therebetween when conductive and prohibit said flow when non-conductive; a saturable magnetic core having a first and second primary winding and a secondary winding, the secondary winding connected to energize the activating circuit; a first control circuit for connecting a source of current and the first primary winding to saturate the core in a direction to cause said transistor to become conductive; a feedback circuit deriving current from that flowing through the load when the transistor is conductive and connected to energize the activating circuit; a second control circuit for connecting a source of current and the second primary winding to saturate the core in a direction to cause said transistor to become non-conductive, a contactor connected in the second control circuit and operable between a first and second position; when said contactor is in the first position, the core is saturated by the first primary winding to make the transistor conductive and the transistor is maintained conductive by current from the feedback circuit, and when in the second position, the core is saturated by the second primary winding to make the transistor non-conductive.

2. In an electric control system, a transistor having a main and an activating circuit; a main source of current; a load connected to receive current supplied by the source through the main circuit; a sustaining circuit arranged to derive current from the load current and connected to the activating circuit to maintain the transistor conducting when once it has been rendered conductive; a saturable magnetic core having a first and second primary winding and a secondary winding; the secondary winding connected to the activating circuit; the first primary winding connected to a source of unidirectional current so the flow therethrough saturates the core in a direction to induce a pulse in the secondary winding to make the transistor conductive; the second primary winding connected to a source of unidirectional current so the flow therethrough saturates the core in a direction to induce a pulse in the secondary winding and make the transistor non-conductive.

3. A control system as described in claim 1 and in which the saturable magnetic core has the property of maintaining residual flux at the saturation value when the primary saturating it is momentarily energized.

4. In an electric control system, a transistor having a main and an activating circuit; a center tap transformer to obtain a main source of current; a load connected to receive current supplied by the source through the center tap and the main circuit; a sustaining circuit having a center tap primary transformer winding connected between the load and the source transformer and a center tap secondary winding connected to the activating circuit to maintain the transistor conducting when current is flowing through the load; a saturable magnetic core having a first and second primary winding and a secondary winding; the secondary winding connected to the activating circuit; the first primary winding connected to a source of unidirectional current so the current flow therethrough saturates the core in a direction to induce a pulse in the secondary winding to make the transistor conductive; the second primary winding connected to a source of unidirectional current so the flow therethrough saturates the core in a direction to induce a pulse in the secondary winding to make the transistor non-conductive, and upon current flow in the first primary winding the transistor is made conductive and maintained conductive by the sustaining circuit independent of the first primary winding and upon current flow in the second primary winding the transistor is made non-conductive.

References Cited in the file of this patent
UNITED STATES PATENTS

| | | |
|---|---|---|
| 1,938,742 | Demarest | Dec. 12, 1933 |
| 2,676,251 | Scarbrough | Apr. 20, 1954 |
| 2,808,990 | Allen | Oct. 8, 1957 |
| 2,810,080 | Trousdale | Oct. 15, 1957 |
| 2,831,126 | Linvill et al. | Apr. 15, 1958 |
| 2,861,237 | Zelina | Nov. 18, 1958 |
| 2,945,190 | Mattson | July 12, 1960 |